United States Patent [19]
Reid

[11] Patent Number: 5,979,612
[45] Date of Patent: Nov. 9, 1999

[54] WHEEL SAFETY SYSTEM FOR VEHICLES

[76] Inventor: Roy Reid, 5245 Langmaid Road, Hampton, Canada, L0B 1J0

[21] Appl. No.: 08/850,100

[22] Filed: May 1, 1997

[30] Foreign Application Priority Data

Apr. 14, 1997 [CA] Canada .................................... 2202610

[51] Int. Cl.⁶ ............................... B60R 19/00; B60T 7/20
[52] U.S. Cl. ........................... 188/151 A; 303/1; 180/271
[58] Field of Search ................... 303/1, 191; 188/151 A; 180/271, 274

[56] References Cited

U.S. PATENT DOCUMENTS

| | | | |
|---|---|---|---|
| 2,506,709 | 5/1950 | Donnelly | 303/1 |
| 2,593,824 | 4/1952 | Wilson | 200/58 |
| 3,101,133 | 8/1963 | House et al. | 188/170 |
| 3,163,092 | 12/1964 | Masser | 92/94 |
| 3,820,854 | 6/1974 | Stearns | 303/9 |
| 3,938,765 | 2/1976 | Cope | 303/1 |
| 3,942,603 | 3/1976 | Pesonen | 180/275 |
| 3,998,413 | 12/1976 | Mygatt et al. | 303/1 |
| 4,093,038 | 6/1978 | Molin | 180/82 |
| 4,235,401 | 11/1980 | Greene, Jr. | 303/1 |
| 4,286,763 | 9/1981 | Hayden | 303/1 |
| 4,884,669 | 12/1989 | Ehrlinger | 303/191 |
| 5,033,592 | 7/1991 | Metzelfeld | 188/170 |
| 5,232,239 | 8/1993 | Hawkins et al. | 280/432 |
| 5,409,303 | 4/1995 | Engelbert | 303/118.1 |
| 5,436,612 | 7/1995 | Aduddell | 340/438 |

FOREIGN PATENT DOCUMENTS 114749   7/1982   Japan .................................. 188/151 A

*Primary Examiner*—Matthew C. Graham
*Attorney, Agent, or Firm*—Ridout & Maybee

[57] ABSTRACT

A wheel safety system for a vehicle. The wheel safety system includes wheel sensors and a brake control module. The wheel sensors are mounted on the vehicle proximate each of the wheels. The sensors detect if a wheel has become disconnected. The brake control module is coupled to the brake system for the vehicle and in response to a wheel sensor detecting a disconnected wheel, the control module actuates the brake system to arrest movement of the wheel.

10 Claims, 3 Drawing Sheets

WHEEL SAFETY SYSTEM FOR VEHICLES

FIELD OF THE INVENTION

The present invention relates to a safety system for vehicles, and more particularly to a system for preventing wheels from flying off a vehicle, and is particularly suited for heavy tractor-trailer vehicles.

BACKGROUND OF THE INVENTION

Tractor-trailers are the preferred mode of transportation for commerce today and will remain to be in the years to come. The tractor-trailer combination provides a cost-effective mode of shipping a wide variety of goods within provincial/state boundaries-and also across the country.

The widespread use of tractor-trailers by the trucking industry and the increased congestion on the major thoroughfares and highways has given rise to safety concerns. In particular, the loss of a wheel from a truck or tractor-trailer, even at low speeds, can cause significant damage if it collides with another moving vehicle or crashes into a building alongside the roadway. In recent years, the problem of "wheels flying off" has come to the forefront in light of an increasing number of highly publicized fatalities resulting from collisions between a wheel assembly lost from a tractor-trailer and another vehicle.

In some cases, a truck will lose a wheel as a result of catastrophic mechanical failure, for example, an axle in the trailer breaks. In other cases, poor installation or servicing results in the bolts holding the wheel to the axle being sheared off or vibrating loose over the course of a long-haul journey. In both cases, the disconnected wheel becomes a heavy flying projectile moving at speeds upwards of 60 mph (100 kph). Collision between the flying wheel and another vehicle usually results in significant injury or fatality.

In Ontario, the problem of flying-off wheels has prompted the Provincial Legislature to enact laws to force truck operators to strictly maintain their rigs to prevent injury or fatality as a result of mechanical failures which may lead to a wheel flying off the vehicle.

Accordingly, there is a need for a safety device which will detect the loss of a wheel from a vehicle and prevent the wheel from escaping completely from the vehicle.

BRIEF SUMMARY OF THE INVENTION

The present invention provides a safety device and method for detecting the dislodgement of a wheel from a heavy vehicle and arresting the disconnected wheel to prevent the wheel from leaving the axle of the vehicle.

In a first aspect, the present invention provides a wheel safety system for actuating the brake system on a vehicle in response to a wheel on the vehicle becoming disconnected, said wheel safety system comprising: (a) a wheel sensor located proximate the wheel on the vehicle, said wheel sensor being responsive to movement of the wheel and producing an output in response thereto; and (b) a brake controller coupled to the brake system of the vehicle and having an input for receiving the output from the wheel sensor, and an actuator for actuating the brake system in response to the output from said wheel sensor so that the brake system arrests movement of the wheel.

In a second aspect, the present invention provides a wheel safety system for actuating the brake system on a vehicle in response to a wheel on the vehicle becoming disconnected, the brake system including brake cylinders having spring brake chambers and service brake chambers in association with each of the wheels, a pressurized air source and air connect lines for pressurizing the brake cylinders and releasing the spring brake chambers, said wheel safety system comprising: (a) wheel sensors for one or more of the wheels on the vehicle, each of said wheel sensors being coupled to said vehicle in a location proximate said associated wheel, and said wheel sensor being responsive to movement of said associated wheel and producing an output in response thereto; and (b) a brake controller coupled to the brake system of the vehicle and having inputs for receiving the output from each of said wheel sensors, and an actuator for activating the brake cylinder for a wheel in response to an output from said wheel sensor for the wheel, so that said brake cylinder arrests said wheel.

In a third aspect, the present invention provides a method for arresting the movement of a wheel which has become disconnected from the axle on a vehicle, said method comprising the steps of: (a) monitoring the wheels on the vehicle; (b) detecting a fault condition wherein a wheel is disconnected from the axle; and (c) in response to said fault condition, applying the brake system for the axle having the disconnected wheel.

BRIEF DESCRIPTION OF THE DRAWINGS

Reference will now be made to the accompanying drawings which show by way of example a preferred embodiment of the present invention and in which:

FIG. 2(*b*) is a partial sectional view of the actuating arm for the wheel safety system taken along line 2—2;

DETAILED DESCRIPTION OF THE PREFERRED EMBODIMENT

Figure 1:
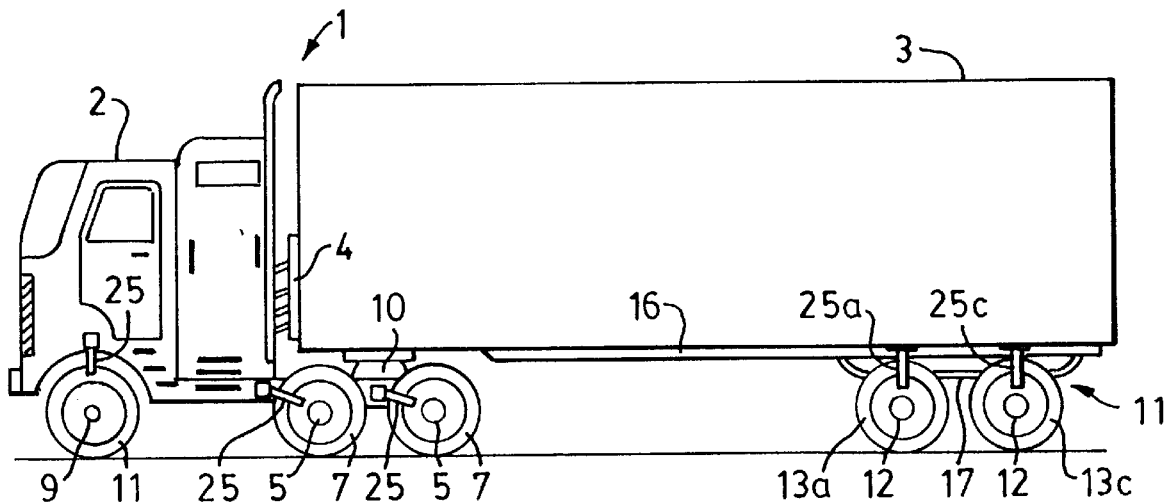
FIG. 1 shows a conventional tractor-trailer combination embodying a wheel safety system according to the present invention.

Reference is first made to FIG. 1 showing a conventional tractor-trailer combination 1 to which the present invention may be applied. It is however understood that the present invention is equally suitable for trucks, buses, etc., and the tractor-trailer combination 1 is chosen for illustrative purposes only. The tractor-trailer combination 1 comprises a tractor 2 and a trailer 3. The tractor 2 includes a power plant or engine (not shown) which is operably connected to drive tandem axles 5. Wheels 7 are connected to respective ends of the tractor axles 5. The forward end of the tractor 2 includes an axle 9 connected to wheels 11 for steering the tractor 2. The electrical and control signals between the tractor 2 and the trailer 3 are coupled through a head board 4. In FIGS. 1 to 5, like reference numerals indicate like elements.

The tractor 2 tows the trailer 3 which is supported on the tractor chassis by a conventional fifth wheel 10, the details of which are known and therefore not illustrated. The rear end 11 of the trailer 3 is supported by a tandem axle assembly comprising non-driving axles 12, shown individually as 12a and 12b. Wheels 13, shown individually as 13a, 13b, 13c, 13d, are connected to the respective ends of the axles 12a and 12b and the tandem axle assembly is connected to the chassis 16 of the trailer 3 by a suspension system 17. The driving and suspension components for the trailer 3 are of known design and need not be described in further detail. It will furthermore be understood that the tractor 2 may comprise a single drive axle, and the trailer 3 may comprise a single axle or more than two axles, for example, a triple axle arrangement.

Figure 2A:
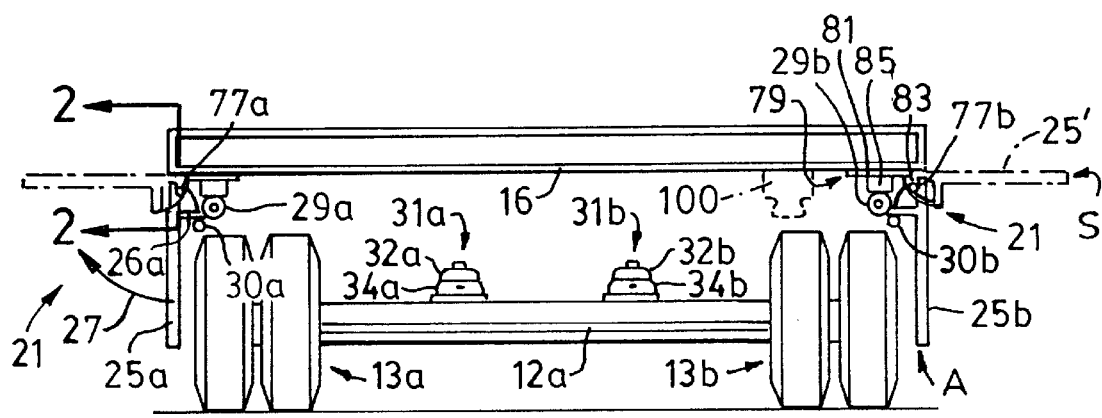
FIG. 2(*a*) is a partial rear view of the trailer of FIG. 1 showing the wheel safety system according to the present invention.
Figure 3:
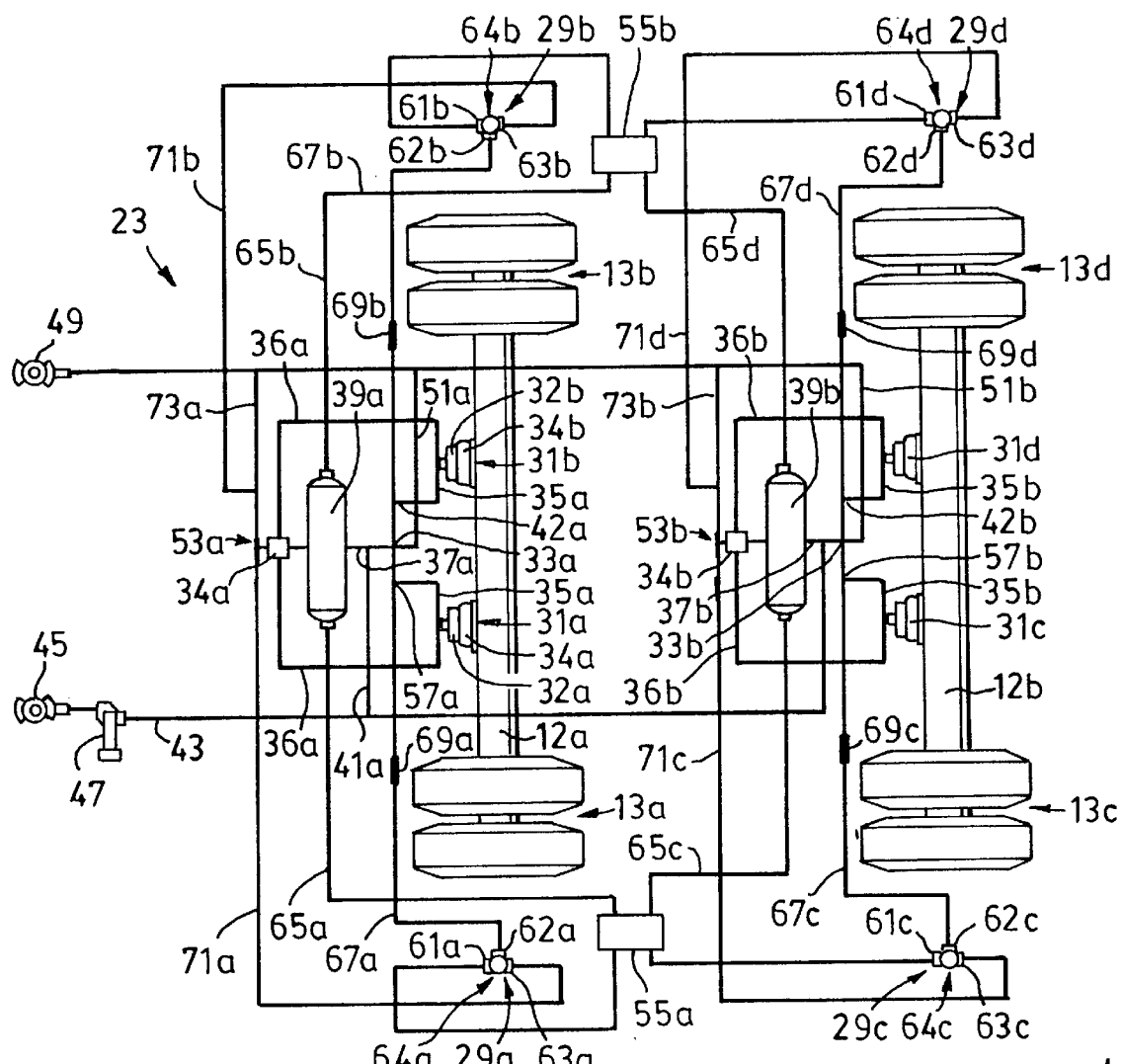
FIG. 3 is a schematic view of a braking system for the trailer of FIG. 1 with the wheel safety system according to the present invention.
Figure 4:
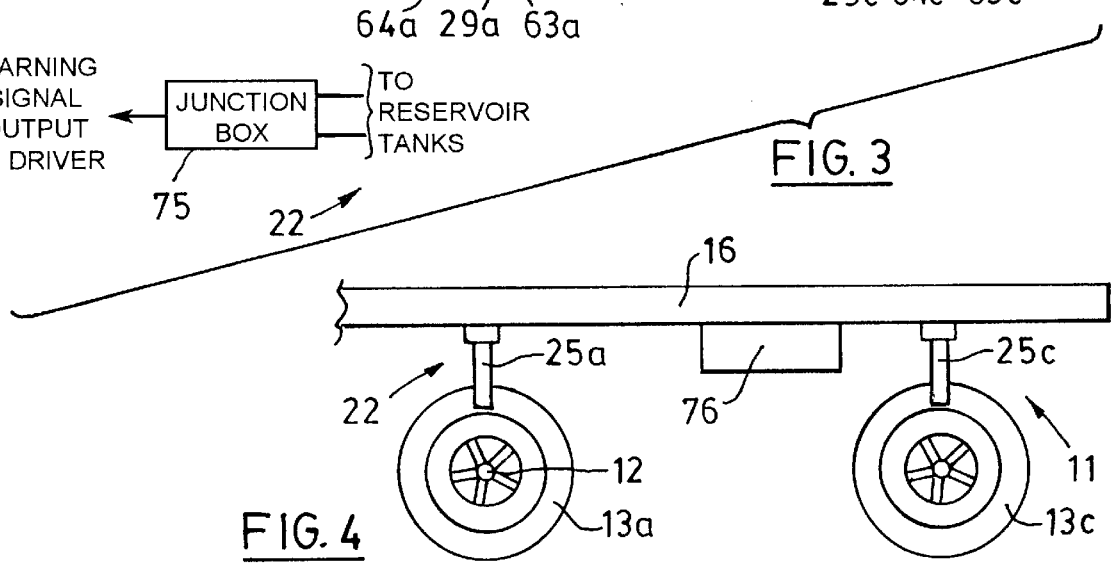
FIG. 4 is a side view of the wheel safety system for the truck trailer.

The present invention provides a wheel safety system for the tractor-trailer combination 1. The wheel safety system comprises two principal components: a wheel monitor module 21 (FIG. 2(a)) and a brake control module 22 (FIG. 3). The brake control module 22 is coupled to a braking system 23 for the tractor-trailer 1 as shown in FIG. 3.

Referring to FIG. 3, the wheel monitor module 21 comprises actuator or wheel movement sensor members 25, shown individually as 25a, 25b, 25c... As will be described, the actuator member 25 functions to detect movement of a wheel 13 when disconnected from the axle 12. An actuator member 25 is mounted on the carriage 16 of the trailer 3 for each of the wheels on the trailer 3. As also shown, the tractor 2 may include wheel movement sensors 25 for each of the wheels 7, 9.

As shown in FIGS. 1 and 2, the actuator members 25 for the trailer 3 are attached to the carrier 16 and extends downwardly in front of the respective wheel 13. Should the wheel mounting bolts become loose and release or the wheel 13 break-off from the end of the axle 12, the movement of the disconnected wheel 13a', i.e. in the direction of arrow 28 (FIG. 5), contacts and deflects the actuator 25. The deflection of the actuator member 25 triggers the brake control module 22 which activates the brake system 23 to apply the brake in order to lock the dislodged wheel and prevent the wheel 13 from leaving the trailer 3, as will now be described in more detail below.

Figure 5:
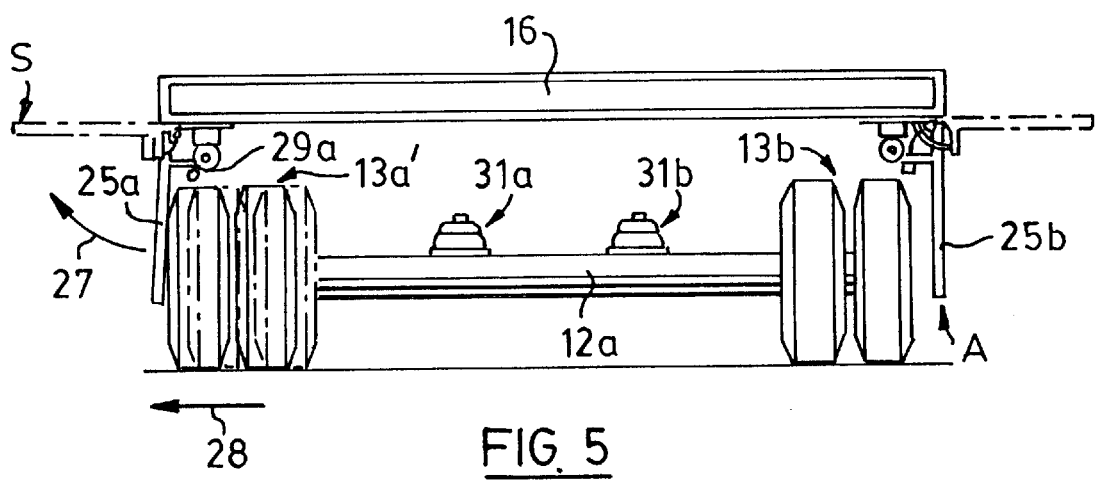
FIG. 5 is a partial rear view of the trailer 1 of FIG. 1 showing the triggering of the wheel safety system by a disconnected wheel.

The wheel safety system includes a wheel movement detector member 25 for each of the wheels 13 on the trailer 3 and the wheels 7 and 11 on the tractor 2. If a wheel 13 disconnects from the axle 12, for example, wheel 13a' as shown in FIG. 5, the disconnected wheel 13a' moves in the direction of arrow 28 and the wheel detector member 25a is contacted and deflected in the direction of arrow 27. The movement of the wheel detector 25a activates a spring break exhaust valve 29, shown individually as 29a. The spring break exhaust valve 29, in turn, triggers the brake control module 22 which causes the brake system 23 to be applied in order to arrest further movement of the wheel 13a' by locking the brake drum for the wheel 13a'.

Reference is next made to FIG. 3 which shows the brake control module 22 for the wheel safety system and the brake system 23 in more detail. The brake control module 22 is coupled to the existing braking system 23 for the tractor-trailer 1. The braking system 23 comprises conventional technology and includes air brake cylinders 31, shown individually as 31a, 31b, 31c, 31d... which are coupled to brake actuators (not shown). In known manner, the brake actuators are operably connected to the brakes for the wheels 13 and control the application and release of the brakes. The air brake cylinders 31 comprise spring brake chambers 32 and service brake chambers 34. Pressurizing the spring brake chambers 32 releases the spring brake action of the cylinder 31, known in the art as "releasing the spring brakes". Typically, the spring brakes 32 are not released until sufficient air pressure is available to actuate the brakes 31 in a service brake mode, known in the art as "actuating the service brakes".

In FIG. 3, the spring brake chambers 32 for the brake cylinders 31 are connected to respective spring brake control valves 33, shown individually as 33a, 33b, via spring brake valve air lines 35, shown individually as 35a, 35b. As also shown, the spring brake control valves 33 each include a port 37a, 37b for coupling to a respective reservoir air tank 39a, 39b, and a port for coupling to an air supply line 43. As also shown in FIG. 3, the service brake chambers 34 in the air brake cylinders 31 are connected to a respective relay valves 34a, 34b on the reservoir tank 39a and 39b via respective service brake air lines 36a, 36b.

As also shown in FIG. 3 the spring brake control valves 33 are coupled to a pressurized air supply line 43 via air connect lines 41a, 41b. The air supply line 43 delivers air to the brake system 23 from a pressurized air supply 45. As shown the pressurized air supply line 43 also includes a line filter 47 of known design. The brake system 23 includes a brake control 49 which provides a brake control signal to actuate the brakes under normal operating conditions. As shown, the brake control 49 is coupled to a port on the respective spring brake control valves 33a, 33b via respective control lines 51a, 51b. The brake control 49 preferably comprises a pedal brake assembly which is operated by the driver in the cab of the tractor 2.

The brake control module 22 is coupled to the brake system 23 and functions to override or activate the brake system 23 if a wheel 13 becomes disconnected from one of the axles 12. Referring to FIG. 3, the brake control module 22 comprises the spring break exhaust valves 29 (one for each wheel 13), shuttle valve assemblies 53a, 53b and shut-down valves 55a, 55b. Each spring break exhaust valve 29 is associated with one of the actuating members 25. As shown in FIG. 3, the spring break exhaust valve 29 comprises three ports 61, 62, 63 and an exhaust 64. Ports 61 comprise input ports and are coupled to a respective output on the reservoir tanks 39 via air input line 65 and the shut-down valves 55. Ports 62 also comprise input ports and are coupled to the respective spring brake control valve 33 via a three-way coupler 57 and air connect lines 67. The air connect lines 67 may include shut-off valves 69 for isolation or disconnect purposes. Ports 63 comprise output ports and are coupled to an input on the shuttle valves 53 via air connect lines 71. As shown, the shuttle valve assemblies 53 are also coupled to the brake control 49 via lines 73.

The spring break exhaust valves 29 actuate the brake system 23 when a wheel 13 becomes dislodged or disconnected from an axle 12a or 12b. As shown in FIG. 2(a), each spring break valve 29 includes an actuation lever 30. The actuation lever 30 is in contact with a corresponding cam lever 26 on the wheel member 25. When a wheel 13 disconnects from the axle 12a, 12b and begins to move outwards (i.e. in the direction of arrow 28 (FIG. 5)), the wheel member 25 is deflected (i.e. moves in the direction of arrow 27). The movement of the wheel member 25 also displaces the cam 26 which moves the actuation lever 30 on the spring break valve 29, and causes the valve 29 to depressurize the respective air brake cylinder 31 by exhausting the air through the exhaust port 64. This, in turn, causes the spring brake for the wheel 13 to be applied. The application of the spring brake locks the wheel 13 via the brake drum thereby preventing further movement of the wheel 13. Through the operation of the shuttle valve 53a, the other air brake cylinder 31b for the axle 12a is also depressurized so that the brake is also applied to the other wheel 13b on the axle 12a. To avoid "jack-knifing", it is preferable to only apply the brakes for the axle 12 from which a wheel 13 has disconnected, for example, axle 12a for wheel 13a' shown in FIG. 5.

Preferably, the wheel safety system includes a junction box 75 which is coupled to the reservoir tanks 39. The junction box 75 includes an appropriate transducer of known design which produces a warning output in the form of an electrical signal to notify the driver in the tractor 2 that a wheel failure has occurred. The notification to the driver may comprise flashing a warning light or sounding an audible alarm or both.

Referring back to FIG. 3, once one of the spring break exhaust valves 29 has been triggered, the brake control module 22 must be reset before normal operation of the brake system 23 can resume. This serves to ensure that the malfunction or wheel fault which triggered the wheel safety system is investigated. As described above, once triggered, the spring break valve 29 exhausts the pressurized air in the reservoir tank 39 thereby depressurizing the brake system 23 and causing the spring brake to be applied to the wheels 13 on the affected axle 12. To stop the flow of air through the exhaust port 64 of the valve 29, the shut-down valve 55 is set. Once the wheel fault condition has been investigated and the faulty wheel 13 replaced, the shut-down valve 55 is reset so that the brake system 23 can be pressurized and the spring brakes released. With the brake system 23 properly pressurized, and the spring brakes released, normal operation may be resumed. The shut-down valves 55 and junction box 75 are suitably located in a service box 76 (FIG. 4) which is mounted underneath the carriage 16 for access by a service technician or the driver.

As shown in FIG. 2(a), the wheel member 25 is hingedly connected to the carriage 16 of the trailer 3 at a pivot point 77. In the engaged or armed position, the wheel member 25 extends substantially parallel to the adjacent wheel 13. The wheel member 25 is preferably positioned as close as possible to the wheel 13. When a wheel 13 disconnects from the axle 12, the movement of the wheel 13 displaces the wheel member 25. The cam lever 26 and the actuation lever 30 on the spring break exhaust valve 29 are configured to trigger when the wheel member 25 is displaced in the direction of arrow 27. It has been found that a 1" gap between the wheel member 25 and the wheel 13 and a 2½" displacement are suitable to detect a wheel fault condition without false triggering resulting for example from an out of true wheel 13 contacting the wheel member 13. For a typical tractor-trailer combination 1, a wheel member 25 of approximately 14" in length is suitable, and a gap of approximately 6" between the actuation lever 30 and the top of the wheel 13 provides adequate clearance.

Figure 2B:
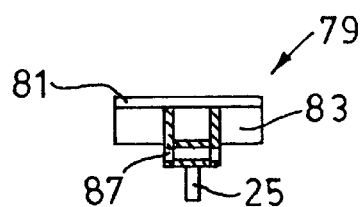

As shown in FIG. 2(a), the wheel member 25 and spring break exhaust valve 29 are mounted to the carrier 16 of the trailer 3 using a bracket 79. The bracket 79 is shown in more detail in FIG. 2(b) and comprises a base plate 81 and an angle bracket 83. The base plate 81 is bolted (or welded) to the underside of the carriage 16 as shown in FIG. 2(a). The spring break exhaust valve 29 is connected to the base plate 81 using a bracket 85. The wheel movement detector member 25 is hingedly connected to the angle bracket 83 at the pivot point 77. As shown in FIG. 2(b), the hinged connection comprises a heavy wall tube 87 into which is seated a shaft connected to the wheel movement detector member 25. The shaft rotates in the tube 87 and allows the wheel detector member 25 to be moved between an armed position A and a disarmed or service position S, as shown in FIG. 2(a). In the service position S, the wheel detector member is shown in broken outline and indicated by a primed reference 25'. In the service position S, the wheel member 25' is swung out of the way so that a mechanic can access the wheels 13 and axle 12. When the servicing is completed, the wheel member 25 is moved back to the armed position A. The wheel detector member 25 may include a spring mechanism to bias the member 25 in the armed position A.

According to another aspect of the invention, the wheel safety system according to the present invention can be utilized as part of a roadside safety check or spot check. To test the braking system 23 and the proper operation of the wheel safety system, the wheel member 25 is manually pulled to actuate the spring break exhaust valve 29. The release of pressurized air through the exhaust port 64 indicates that the brake control module 22 is functioning properly, and advantageously it is not necessary for an inspection technician or a police officer to crawl underneath the trailer 3 to check the brakes.

In summary, the present invention provides a wheel safety system which can be retrofitted to existing tractor-trailers. As described, the wheel safety system detects if one or more wheels 13 on the trailer 3 (or wheels 7, 11 on the tractor 2) have become disconnected and activates the brake system 23 to engage the wheel 13 through the application of the brakes and thereby prevent further movement of the faulty wheel. As described, the shuttle valves 53 allow the brakes to be applied to the axle with the faulty wheel 13, while the wheels on the other axles remain under normal control of the brake system 23. It will be appreciated that this mode of operation prevents the back-end of the trailer 3 from locking up and causing a potentially uncontrollable skid or jackknife. Once notified of the fault condition by the warning signal, the driver is free to apply the brakes to the other wheels in a controlled manner and safely steer the tractor-trailer to the side of the roadway.

According to another aspect of the present invention, the wheel member 25 is replaced by an opto-electronic detector 100 shown in broken outline in FIG. 2(a). The opto-electronic detector 100 monitors the wheel 13b using a light beam and detector. If the wheel 13b becomes disconnected from the axle 12, the detector 100 generates an output signal which triggers the spring break exhaust valve 29b through an appropriate electromechanical actuator.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A wheel safety system for actuating the brake system on a vehicle in response to a wheel on the vehicle becoming disconnected, said wheel safety system comprising:

(a) a wheel sensor located proximate the wheel on the vehicle, said wheel sensor being responsive to movement of the wheel and producing an output in response thereto;

(b) a brake controller coupled to the brake system of the vehicle and having an input for receiving the output from the wheel sensor, and an actuator for actuating the brake system in response to the output from said wheel sensor; and (c) wherein said brake system provider means for arresting separation of the wheel from the vehicle.

2. The wheel safety system as claimed in claim 1, wherein said wheel sensor comprises a wheel movement detector member, said detector member being hingedly coupled proximate to the wheel and movable when contacted by the wheel and having a cam lever for translating movement of the member into an output.

3. The wheel safety system as claimed in claim 2, wherein said brake control module comprises a control valve coupled to a brake control line in the brake system, said control valve including an actuation lever operatively coupled to the cam lever of said wheel movement detector member, and in response to operation of said actuation lever, said control valve changing flow in the said brake control line to apply the brake system so that movement of the wheel is arrested.

4. A method for arresting the movement of a wheel which has become disconnected from the axle on a vehicle, said method comprising the steps of:

(a) monitoring the wheels on the vehicle;

(b) detecting a fault condition wherein a wheel is disconnected from the axle;

(c) in response to said fault condition, applying the brake system for the axle having the disconnected wheel; and (d) arresting separation of the disconnected wheel from the vehicle through application of the brake system.

5. The method as claimed in claim 4, further comprising the step of issuing a warning signal for notifying the driver of the vehicle.

6. A wheel safety system for actuating the brake system on a vehicle in response to a wheel on the vehicle becoming disconnected, the brake system including brake cylinders having spring brake chambers and service brake chambers in association with each of the wheels, a pressurized air source and air connect lines for pressurizing the brake cylinders and releasing the spring brake chambers, said wheel safety system comprising:

(a) wheel sensors for one or more of the wheels on the vehicle, each of said wheel sensors being coupled to said vehicle in a location proximate said associated wheel, and said wheel sensor being responsive to movement of said associated wheel and producing an output in response thereto;

(b) a brake controller coupled to the brake system of the vehicle and having inputs for receiving the output from each of said wheel sensors, and an actuator for activating the brake cylinder for a wheel in response to an output from said wheel sensor for the wheel; and (c) wherein said brake system provides means for arresting separation of the wheel from the vehicle.

7. The wheel safety system as claimed in claim 6, wherein said wheel sensor comprises a wheel movement detector member, said detector member being hingedly coupled proximate to the associated wheel and movable when contacted by the wheel and having a cam lever for translating movement of the member into an output.

8. The wheel safety system as claimed in claim 7, wherein said brake control module comprises a control valve coupled to a brake control line in the brake system, said control valve including an actuation lever operatively coupled to the cam lever of the corresponding wheel movement detector member, and in response to operation of said actuation lever, said control valve changing flow in the said brake control line to apply the brake system so that movement of the wheel is arrested.

9. The wheel safety system as claimed in claim 8, further including a shut-down valve for resetting the system.

10. The wheel safety system as claimed in claim 9, further including a warning signal generator coupled to said brake controller for generating an output signal to notify the driver of the vehicle.

* * * * *